H. Smith.
Corn Planter.
No. 87,376.   Patented Mar. 2, 1869.

Witnesses:
Inventor,
Homer Smith

UNITED STATES PATENT OFFICE.

HOMER SMITH, OF KIRKSVILLE, MISSOURI.

*Letters Patent No. 87,376, dated March 2, 1869.*

IMPROVEMENT IN CORN-PLANTER, GRAIN-DRILL, AND HARROW, COMBINED.

The Schedule referred to in these Letters Patent and making part of the same.

*To all whom it may concern:*

Be it known that I, HOMER SMITH, of Kirksville, in the county of Adair, and State of Missouri, have invented a new and valuable Improvement in Corn-Planters, Grain-Drills, and Harrows; and I do hereby declare that the following is a full, clear, and exact description of the construction and operation of the same, reference being had to the annexed drawings, making a part of this specification, and to the letters and figures of reference marked thereon.

Figure 1, of the drawings, is a plan view of my device;

Figure 1:
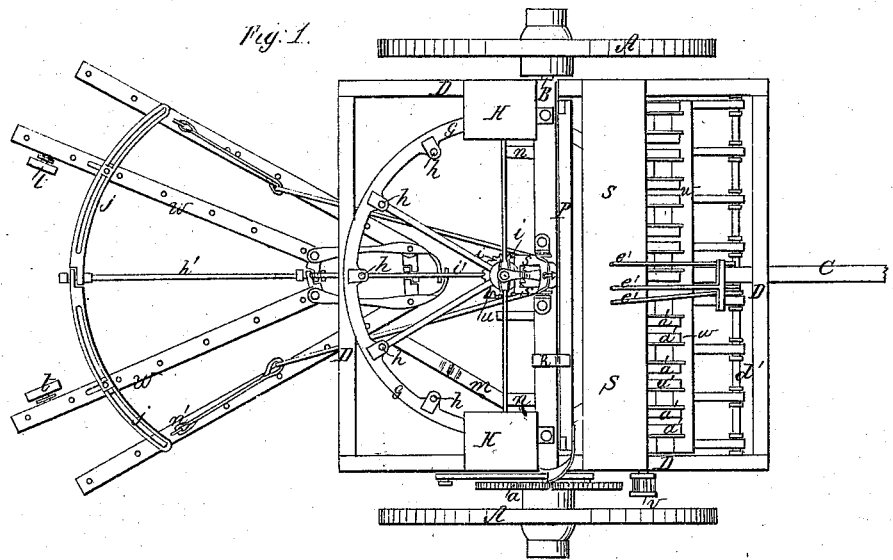
Figure 2:
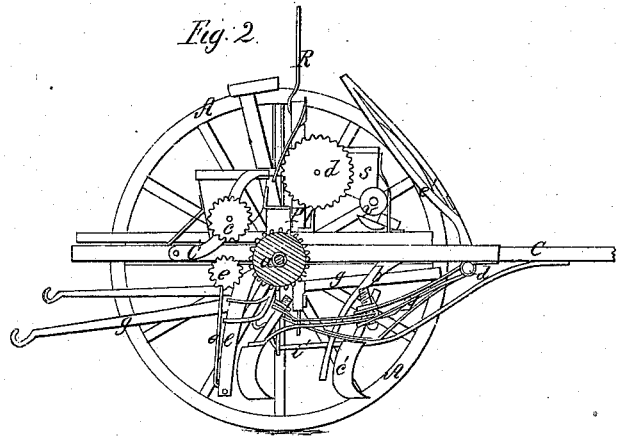
Figure 2 is a side view, with a carriage-wheel removed.
Figure 3:
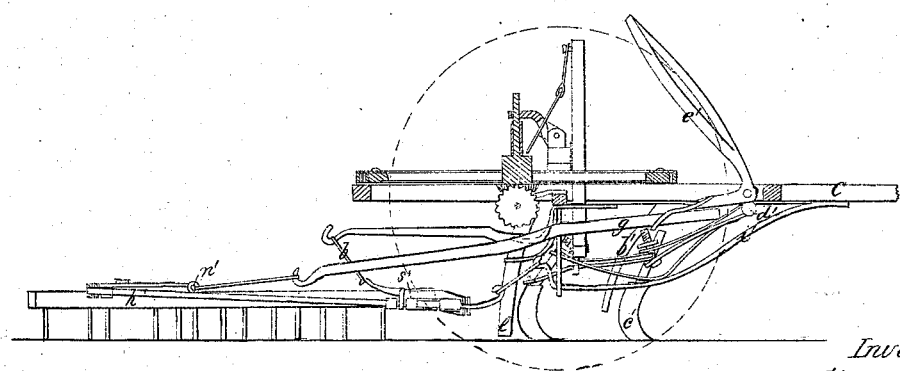
Figure 3 is a longitudinal section.

My invention has relation to devices for planting corn, sowing or drilling grain, and harrowing the earth; and It consists in constructing and combining novel and efficient means for accomplishing the results enumerated.

Letter A, of the drawings, represents the wheels,

Letter B, the axle, and

Letter C, the neap of a carriage or sulky to which my device is attached; the inner end of the left-hand wheel having affixed thereto a cog-wheel, $a$, by which the machinery, hereinafter mentioned, is mainly actuated.

The letter D is a frame, of a quadrangular form, adjusted on the axle and neap in the manner shown, and which serves to hold and sustain the main part of the machinery above the axle.

On the left-hand side of frame D, I affix an arm, C', which serves as a rest, and in which bearings are formed for the journals of pinions $c$ and $d$, hereinafter mentioned.

The pinions $c$ and $d$ are connected to the arm C' by a journal rotating therein, and are adjusted to be thrown in or out of gear with the cogged wheel $a$, at will, by the means hereinafter described.

The letter $e$ is a pinion attached to the end of a shaft that extends inward, midway between the carriage-wheels, and resting and rotating in bearings formed in arms that extend rearward from the axle.

On the inner end of this shaft is attached a bevelled pinion marked $u$, which meshes with the cogs on the bevelled pinion of the revolving carrier, hereinafter mentioned, and actuates the same.

The pinion $u$ is thrown in and out of gear with the pinion $c$, at will, by the means hereinafter specified.

The letter $g$ represents the revolving carrier of the corn for planting. It is a wheel, with a series of small apertures through its rim, that are opened or closed, at pleasure, by means of slides and set-screws adjusted over them, as shown on the drawings.

These slides and set-screws are marked $h$ on the drawings, each of which covers an aperture in the rim of the wheel.

The carrier is rotated by means of the bevelled pinion $i$, working with the bevelled pinion $u$, above described.

The letters H are hoppers, arranged respectively upon the sides of the main frame of the carriage in which the corn for planting is placed. Their bottoms are set inward from said frame, and the inner sides thereof are left open.

The carrier G passes under the openings in the bottoms of these hoppers, and receives the corn in such apertures as may be left open in its rim. In its rotations, it moves so closely to the open bottoms of the hoppers, that no kernel of corn can pass therefrom, except through the apertures aforesaid.

The letters $l$ are tubes or conduits adjusted immediately under the hoppers, and below the carrier, the office of which is to receive the corn after it has passed through the apertures in the rim of the carrier, and conduct it to the ground.

The letters $m$ are cross-pieces affixed to spokes in the carrier, on opposite sides thereof, formed with a depression at their centres, which serves to operate the springs $n$, next mentioned.

The springs $n$ extend rearward from the carriage-axle, with ends bent upward and over, in such manner that when passed by the centres of cross-pieces $m$, respectively, they shall be depressed.

I attach rods $o$ to the ends of these springs respectively, and connect them at their bottoms to the ends of lever-valves, $c$, the levers being outside, and the valves inside of the conduits $l$, above mentioned.

Above the carrier, and between it and the arm in which the end of its shaft rotates, I affix, upon said shaft, flanches, represented by $r$ on the drawings, and upon the axle, I attach a brake, $s$, which is designed for operating with said flanches, to stop the wheel at the point desired, as hereinafter mentioned.

The letter P is a sliding frame, adjusted in staples on a cross-bar of the main frame, as shown, the office of which is to throw the pinions of the machine in and out of gear with the cog-wheel $a$, and also to operate the brake $s$.

Letter R is a lever pivoted to a cross-bar of the main frame, and having a bent shoulder under the top of frame P, the office of which is to raise said frame when desirable. Said frame is raised, and the pinions of the machine thrown out of gear, by moving said lever sideways, to the left, from the driver's seat, and said frame is lowered by its own weight, and the pinions placed in gear when the said lever is moved to the right.

To plant corn in squares, I open one aperture in the rim of the carrier, on each side of the carrier, at precisely opposite points.

To plant corn in drills, or rows running one way only, I open as many of said apertures as may be desirable, the number of such openings always corresponding to the distances desired between the hills of corn.

The letter S, of the drawings, represents a seed-box adjusted on the main frame of the carriage. I construct this said box with compartments, in order that the seed, when being sown upon a hill-side, may not be forced to either end of the box.

My seed-box is open, at its bottom, at the extreme front side only. Immediately under, or in this opening, I adjust a revolving cylinder, connected with and rotated by the pinion $v$ when in gear.

This cylinder extends across the entire length of the seed-box, and it is formed with grooves in its surface, in which the grain is carried from the seed-box and emptied upon the apron $w$. These grooves may be opened and closed by means of screws.

Upon this apron, I place pivoted guides marked $a'$, the lower points of which may be moved to the right or left, at will.

When these lower points are brought nearly together, they serve to conduct the grain to openings in the apron immediately above the conduits $b'$, from which it is carried to the ground immediately in the rear of the drill-plows $c'$. These devices enable me to sow grain in drills when desirable so to do.

For broadcast sowing, I adjust the guides $a'$ on a line at right angles with the seed-box, and thereby permit the grain to flow down the apron, to the ground.

My plows are adjusted upon series of springs, in the manner shown. The springs are marked $y$ on the drawings; their front ends secured to a roller, $d'$, and their rear ends resting in slots formed in the lower cross-bar of the sliding frame P.

The plows, arranged for making furrows for corn, are severally attached to extended arms upon the outside springs, of the series above mentioned, in the manner represented.

This arrangement of attaching the plows to springs, gives said plows an elastic movement, and adapts them to plowing upon uneven or stony soil.

The letters $e'$ are three elbow-levers pivoted to the neap of the carriage, and severally resting, at their lower ends, upon the upper sides of levers $g$.

Those last-named levers extend to the rear of frame D, where they are provided with hooked ends, to which, when desirable, I attach the harrow W.

The harrow W is constructed in the form shown in fig. 1. It has a middle iron bar marked $h'$, which, when attached to the carriage, is hooked to the rear end of the rod $i'$, that is fastened at the forward end to the neap of the carriage.

The circular slotted bars $j$ are united at their centres, as shown, forming, with the rear end of bar $h'$, a convenient hinge.

By means of these slots in the circular bars, and set-screws or bolts adjusting them, I am enabled to widen or narrow the harrow, at will.

The outside levers $g$ are connected with the outer frame of the harrow by the hooks $n'$, while the middle lever $g$ is united thereto by means of a rod, $o'$, which connects it with the dog $s'$.

This dog is pivoted in an upright arm upon the bar or rod $h'$. When the rear end of this dog is raised, the front end thereof is pushed downward between shoulders formed in the jointed shackles that unite the front end of the harrow, and prevents the hinges therein from operating. The effect of this movement is to enable the operator to raise the entire harrow, instead of a part thereof, at once.

When this dog is not thus forced into said joint, the operator can raise either side of the harrow he may choose, by means of the outside elbow-levers $e'$.

The dog is operated by the middle elbow-lever $e'$.

The letters $t$ are small casters or wheels attached to the harrow at front and rear, as shown, the office of which is to aid in regulating the depth I desire to stir the ground or cover the corn; also to roll or press down the earth where the corn is planted.

I usually adjust these wheels to the harrow by means of slotted bars and thumb-screws, to make them adjustable, but I may also adjust them by other suitable means, the main object being to adjust said wheels so that they shall serve as gauges, to regulate the depth I desire the harrow-teeth to penetrate the soil.

I make two of the wheels with a rim wide enough to serve as rollers, thus making them serve a double office.

In the lower inside of the hoppers H, I sometimes construct small openings, and close them with suitable metallic springs, so adjusted as to prevent kernels of corn, or other grain, from choking up the passage-way to the apertures in the carrier, the operation being that the springs will be pressed outward by the wedged kernels, and thereby a passage secured for such kernels.

What I claim as my invention, and desire to secure by Letters Patent, is—

1. The carrier G, with its apertures, and slides, and set-screws $h$, when constructed and operating substantially as and for the purposes specified.

2. In combination with the carrier G, the cross-pieces $m$, springs $n$, rods $o$, conduits $l$, and lever-valves, as described, when constructed and operating substantially as described.

3. The guides $a'$, in combination with a seed-sower, arranged and operating substantially as described.

4. The dog $s'$, in combination with a harrow, constructed and operating as specified.

5. The sliding frame P, when constructed, arranged, and operating substantially as and for the purposes described.

6. A combined corn-planter, seed-sower, and harrow, having carrier G, cross-bars $m$, spring $n$, rods $o$, flanches $r$, brake $s$, guides $a'$, levers $e'$ and $g$, springs $y$, harrow W, with its slotted bar $j$, dog $s'$, and guide-wheels $a'$, constructed, arranged, and operating substantially as described.

HOMER SMITH.

Witnesses:
 JAMES P. GREVES,
 A. G. HEYLMUN.